(12) United States Patent  (10) Patent No.: US 7,430,575 B2
Nakanishi  (45) Date of Patent: Sep. 30, 2008

(54) ONE-DIMENSIONAL FOURIER TRANSFORM PROGRAM, METHOD AND APPARATUS

(75) Inventor: Makoto Nakanishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 663 days.

(21) Appl. No.: 10/861,561

(22) Filed: Jun. 4, 2004

(65) Prior Publication Data

US 2005/0138097 A1 Jun. 23, 2005

(30) Foreign Application Priority Data

Dec. 19, 2003 (JP) ............... 2003-421900

(51) Int. Cl.
*G06F 17/14* (2006.01)
(52) U.S. Cl. ..................... 708/403; 708/404
(58) Field of Classification Search .......... 708/403–404
See application file for complete search history.

(56) References Cited

U.S. PATENT DOCUMENTS

| 6,728,742 B1* | 4/2004 | Hertz ..................... 708/404 |
| 2004/0039765 A1* | 2/2004 | Nakazuru et al. ........... 708/404 |
| 2005/0182806 A1* | 8/2005 | Krishnamoorthi et al. ... 708/404 |

FOREIGN PATENT DOCUMENTS

| JP | 54-34643 | 3/1979 |
| JP | 02-101575 | 4/1990 |
| JP | 7-61600 | 1/1995 |
| JP | 11-161637 | 6/1999 |

OTHER PUBLICATIONS

G.W. Stewart; "A Parallel QR-algorithm"; Parallel Computing, p. 196; North-Holland.
Paul N. Swarztrauber; Multiprocessor FFTs; Parallel Computing 5; 1987; pp. 197-210; North Holland.

* cited by examiner

*Primary Examiner*—Tan V Mai
(74) *Attorney, Agent, or Firm*—Greer, Burns & Crain, Ltd.

(57) ABSTRACT

A one-dimensional Fourier transform program for quickly performing a one-dimensional Fourier transform intended for a scalar computer comprises a step of resolving a data length N of one-dimensional data into the product of factors $N_1 \times N_2 \times \ldots \times N_m$, a step of setting the data length N as P×Q, calculating twiddle factors that are required for a multiplication with results of a one-dimensional Fourier transform of a length Q, which is performed by P times, for an initial one of Q-1 twiddle factors for multiplication intended for each of P Fourier transform results, while changing P and Q, and storing calculation results in a table, and a step of performing a Fourier transform of data as m separated phases with the table for storing the calculated twiddle factors.

10 Claims, 11 Drawing Sheets

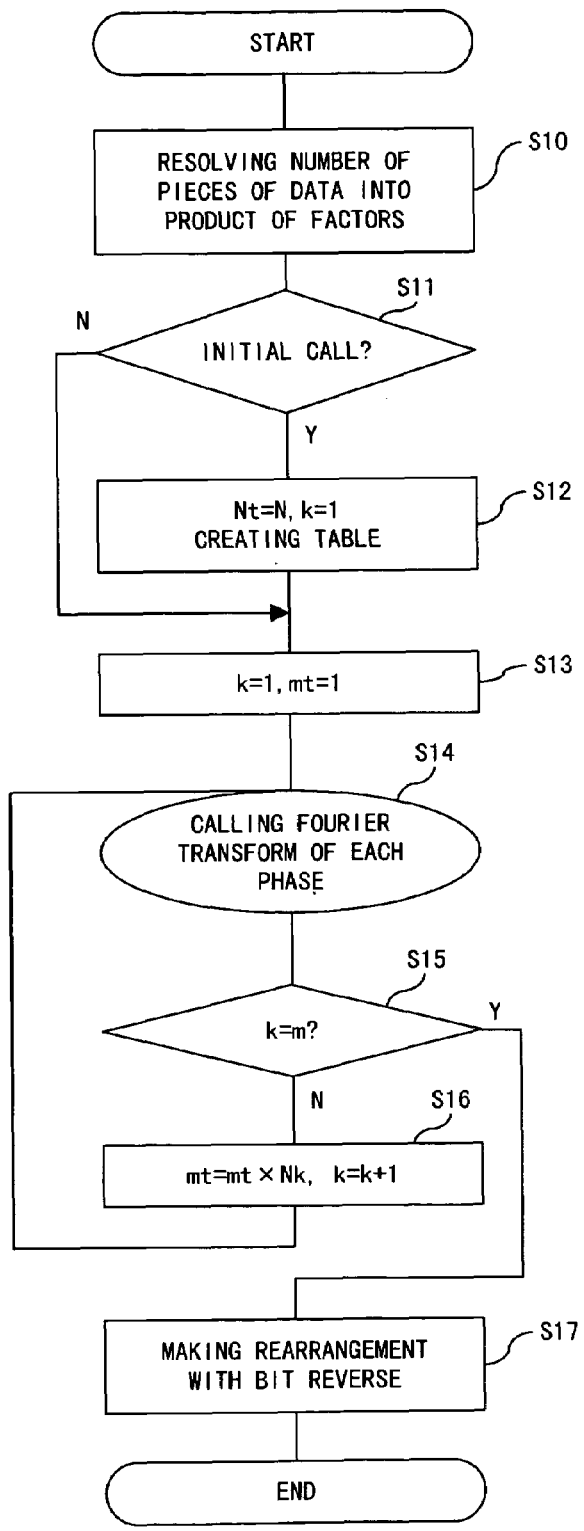
F I G. 2

$$\begin{pmatrix} 1 & 1 & \cdot & \cdot & \cdot & \cdot & 1 \\ 1 & \omega & \omega^2 & \omega^3 & \cdot & \cdot & \omega^{Q-1} \\ 1 & \omega^2 & \omega^4 & \omega^6 & \cdot & \cdot & \cdot \\ \cdot & \omega^3 & \omega^6 & \omega^9 & \cdot & \cdot & \cdot \\ \cdot & \cdot & \cdot & & & & \\ \cdot & \cdot & \cdot & & & & \\ 1 & \omega^{P-1} & \cdot & & & & \end{pmatrix}$$

with Q COLUMNS and P ROWS

F I G. 3

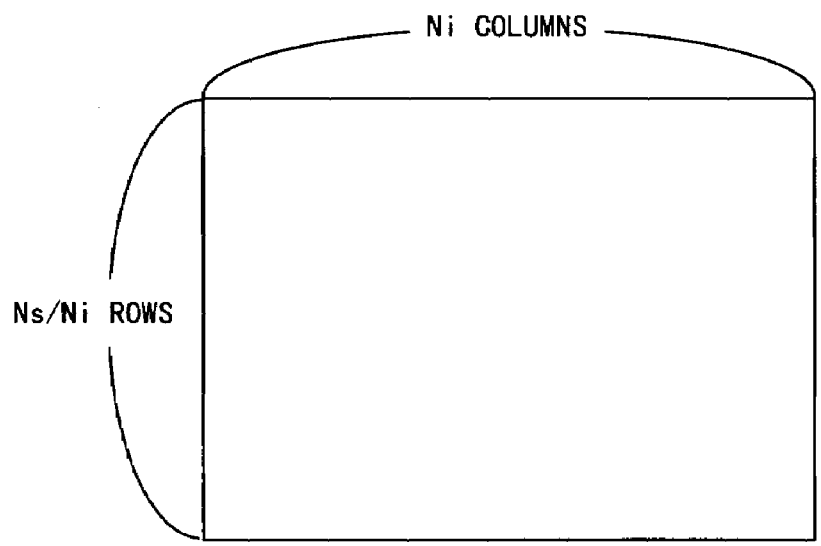
F I G. 6

ONE-DIMENSIONAL FOURIER TRANSFORM PROGRAM, METHOD AND APPARATUS

BACKGROUND OF THE INVENTION

1. Field of the Invention

The present invention relates to a Fourier transform used in various types of digital signal processes, and more particularly, to a program, method and apparatus for processing a fast Fourier transform.

2. Description of the Related Art

A one-dimensional Fourier transform, and a multi-dimensional Fourier transform of two dimensions or more is widely used in various types of technical fields. Especially, a process for the multi-dimensional Fourier transform such as a three-dimensional Fourier transform has been frequently performed with a vector computer in recent years (see Japanese Patent Publication No. HEI7-6160 "Complex Fast Fourier Transform Processing Method Using Vector Computer").

Three-dimensional Fourier transform algorithms intended for such a vector computer have been developed with the goal of increasing a vector length as much as possible. Processes for the first and the second dimensions can be executed in parallel, and an algorithm for implementing a vector length as n1 (the first dimension)×n2 (the second dimension) is adopted to improve machine performance with a sequential access.

However, if the value of n1 or n2 becomes large, data overflows from a cache when a memory is accessed to load the data, and the cache performance cannot be fully utilized.

In the meantime, hardware advances of a scalar processor have been remarkably made in recent years, and it is expected to improve process performance by executing a Fourier transform process with the scalar processor. However, an algorithm intended for a vector processor, which has been the mainstream in recent years, is unavailable to the scalar processor unchanged, and a new algorithm for improving the speed of a Fourier transform process with the scalar processor is required.

SUMMARY OF THE INVENTION

An object of the present invention is to provide a program, method and apparatus for quickly performing a one-dimensional Fourier transform intended for a scalar computer by reducing the number of accesses to a trigonometric function table that stores twiddle factors multiplied with Fourier transform results of data, and by making accesses sequential, especially in a Fourier transform process in view of the above described problems.

The one-dimensional Fourier transform program for quickly processing a one-dimensional Fourier transform according to the present invention, in order to achieve the above described object, comprises: a data length resolving step of resolving a data length N of one-dimensional data into a product of m factors $N_1 \times N_2 \times \ldots \times N_m$; a twiddle factor storing step of setting the data length N as P×Q, calculating twiddle factors that are required for a multiplication with results of a one-dimensional Fourier transform of a length Q, which is performed by P times, for one of the results of the Fourier transform performed by P times, which requires twiddle factors for the multiplication, while maintaining an order of the product of the m factors and changing P and Q, and storing calculation results in a table; and a Fourier transform step of performing a Fourier transform of data as m separated phases with the table for storing the calculated twiddle factors. Additionally, a calculating apparatus quickly processing a one-dimensional Fourier transform comprises: a data length resolving unit resolving a data length N of one-dimensional data into a product of m factors $N_1 \times N_2 \times \ldots \times N_m$; a twiddle factor storing unit setting the data length N as P×Q, calculating twiddle factors that are required for a multiplication with results of a one-dimensional Fourier transform of a length Q, which is performed by P times, for an initial one of Q−1 twiddle factors for multiplication intended for each of P Fourier transform results, while maintaining an order of the product of the m factors and changing P and Q, and storing calculation results in a table; and a Fourier transform unit performing a Fourier transform of data as m separated phases with the table for storing the calculated twiddle factors.

Furthermore, a method quickly calculating a one-dimensional Fourier transform comprises: a data length resolving step of resolving a data length N of one-dimensional data into a product of m factors $N_1 \times N_2 \times \ldots \times N_m$; a twiddle factor storing step of setting the data length N as P×Q, calculating twiddle factors that are required for a multiplication with results of a one-dimensional Fourier transform of a length Q, which is performed by P times, for an initial one of Q−1 twiddle factors for multiplication intended for each of P Fourier transform results, while maintaining an order of the product of the m factors and changing P and Q, and storing calculation results in a table; and a Fourier transform step of performing a Fourier transform of data as m separated phases with the table for storing the calculated twiddle factors.

BRIEF DESCRIPTION OF THE DRAWINGS

FIG. 2 is a flowchart showing the whole of a 2-radix Fourier transform in a first preferred embodiment;

FIG. 3 explains an array format of twiddle factors multiplied with Fourier transform results of data;

FIG. 6 explains the format of an array when a one-dimensional array is regarded as a two-dimensional array;

DESCRIPTION OF THE PREFERRED EMBODIMENTS

Figure 1:
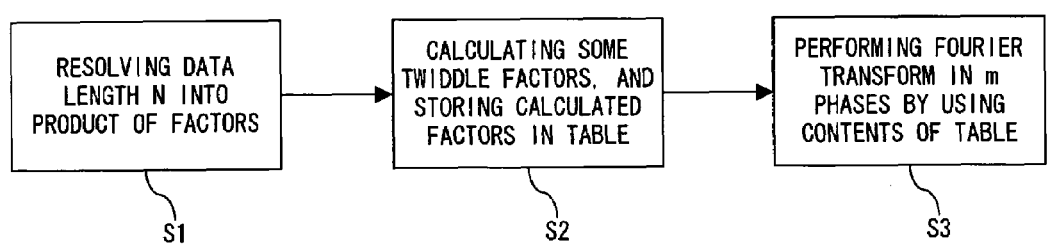
FIG. 1 is a block diagram showing the principle of functions of a one-dimensional Fourier transform program according to the present invention.

FIG. 1 is a block diagram showing the principle of functions of a one-dimensional Fourier transform program according to the present invention. This figure is a block diagram showing the principle of the functions of a program, which is intended for a scalar computer, for quickly performing a one-dimensional Fourier transform.

In FIG. 1, in step S1, a data length N of one-dimensional data is resolved into the product of factors $N_1 \times N_2' \ldots \times Nm$.

In step S2, the data length N is set as P×Q, and the initial one of Q−1 twiddle factors for multiplication intended for each of P one-dimensional Fourier transform results among the P twiddle factors which has a length Q and is required for multiplication intended for each one-dimensional Fourier transform result while maintaining the order of products of m factors and changing P and Q. In step S3, Fourier transform is performed for data in m phases by using the contents of the table.

In a preferred embodiment according to the present invention, in the process for storing twiddle factors in a table, which is executed in step S2 of FIG. 1, a step of respectively setting Q and P as N and $N_2 \times N_3 \times \ldots \times N_m$, calculating P−1 twiddle factors, and storing calculation results in a table 1; a step of respectively setting Q and P as $N_2$ and $N_3 \times N_4 \times \ldots \times N_m$, calculating P−1 twiddle factors, and storing calculation results in a table 2; a step of successively changing Q and P in a similar manner, and executing a similar process; and a step of lastly setting Q and P as $N_{m-1}$ and $N_m$, and calculating P−1 twiddle factors, calculating P−1 twiddle factors, and storing calculation results in a table m−1 may be also comprised.

Additionally, in the preferred embodiment, in each of phases from the first to an (m−1)th phases other than the last phase among m phases in step S3 of FIG. 1, a step of calculating other twiddle factors not stored in a table n among the above described twiddle factors to be multiplied with the results of the one-dimensional Fourier transform performed by P times during an access to data, for which the Fourier transform is to be performed, by using contents stored in the table n which makes a one-to-one correspondence with an nth phase; a step of performing the one-dimensional Fourier transform by P times; and a twiddle factor multiplying step of multiplying the results of the Fourier transform by twiddle factors stored in the table n, and by other twiddle factors calculated with recurrence equations may be also comprised. In this case, in the above described step of calculating other twiddle factors, other twiddle factors can be also calculated with the recurrence equations by using the contents stored in the above described table n.

Furthermore, a step of storing data of multiplication results obtained by the above described step of multiplying twiddle factors in bit-reversed positions, and using the data as an output of the above described nth phase; a step of storing data of the results of the Fourier transform in the last mth phase in bit-reversed positions, and using the data as an output of the mth phase; and a step of rearranging the output of the mth phase with bit reverse may be also comprised.

In the preferred embodiment according to the present invention, in correspondence with the m phases in step S3 of FIG. 1, two regions 1 and 2 are provided as m-dimensional array regions for storing input and output data, outputs results of a process for the input data stored in the region 1 in the first phase are stored in positions where a multi-dimensional transposition for an m-dimensional array is performed in the region 2, outputs results of a process for the input data stored in the region 2 in the second phase are stored in positions where the multi-dimensional transposition for an m-dimensional array is performed in the region 1 in the second phase, and a process may be executed while alternately replacing the regions 1 and 2 as regions for storing input and output data in the third and subsequent phases.

Or, in the preferred embodiment, a step of performing a multi-dimensional transposition for an m-dimensional array which stores results of a Fourier transform step after the Fourier transform step separated into m phases in step S3 is terminated can be further comprised.

According to the present invention, only some of required twiddle factors are calculated and stored in a trigonometric function table before an actual Fourier transform process, and other twiddle factors are calculated during an access to data, whereby the number of accesses to the trigonometric function table can be significantly reduced, accesses to the trigonometric function table can be made sequential in each of m phases, and the speed of a one-dimensional Fourier transform process can be improved. Furthermore, the one-dimensional Fourier transform process is recursively executed in m phases, whereby the process can be executed by storing data in a cache as close to a CPU as possible in each phase, and the speed of the Fourier transform process can be further improved.

Before preferred embodiments according to the present invention are specifically described, a fast Fourier transform technique is initially described by mainly referring to a 4-step algorithm used as a fundamental algorithm in the preferred embodiments.

Normally, a Fourier transform for n pieces of data $x_j (j=0, \ldots, n-1)$ is defined by the following equation (1).

$$a_k = \sum_{j=0}^{n-1} x_j \exp(-2\pi i j k / n) \quad k = 0, \ldots, n-1 \quad (1)$$

where i is an imaginary unit.

However, if the number of pieces of data n is large, the amount of calculation becomes large if the equation (1) is calculated unchanged. Therefore, a fast Fourier transform that resolves the number of pieces of data n into radixes (bases) and calculates the data is used.

If the number of pieces of data n can be resolved into the product of two numbers p and q, j and k included in the equation (1) can be written as equations (2).

$$j = j1 + j2 \times p, \quad k = k1 + k2 \times q \quad (2)$$

where j1 and k2 are $0, \ldots, p-1$, and j2 and k1 are $0, \ldots q-1$.

For example, if j1=j2=0, j becomes 0. Or, if j1=p−1, and j2=q−1, j becomes n−1. Or, if the equation (1) is developed with the equations (2), the following equation (3) is obtained.

$$a_{k1+k2 \times q} = \sum_{j1=0}^{p-1} \sum_{j2=0}^{q-1} x_{j1+j2 \times p} \exp(-2\pi i (j1 + j2 \times p)(k1 + k2 \times q)/n) \quad (3)$$

Here, if a term exp is organized by noting that n is the product of p and q, the following equation (4) is obtained.

$$a_{k1+k2 \times q} = \sum_{j1=0}^{p-1} \sum_{j2=0}^{q-1} x_{j1+j2 \times p} \exp(-2\pi i (j1 \times k1 + j1 \times k2 \times q + j2 \times p \times k1)/n) \quad (4)$$

$$= \sum_{j1=0}^{p-1} \exp(-2\pi i (j1 \times k2)/p) \times$$

$$\exp(-2\pi i (j1 \times k1)/n) \times$$

$$\sum_{j2=0}^{q-1} x_{j1+j2 \times p} \exp(-2\pi i (j2 \times k1)/q)$$

Here, if $x_{j1+j2\times P}$ is represented as an element of a matrix of p rows and q columns, it becomes an element $X(j1,j2)$ of a matrix $X(0:p-1, 0:q-1)$. Accordingly, a Fourier transform of a length q is performed with the following equation (5) as a first step.

$$X(j1, k1) = \sum_{j2=0}^{q-1} X(j1, j2) \times \exp(-2\pi i(j2 \times k1)/q) \quad (5)$$

Next, each element $X(j1,k1)$ as a result of the Fourier transform is multiplied by a twiddle factor as represented by the following equation (6) as a second step.

$$X(j1,k1)=\exp(-2\pi i(j1\times k1)/n)\times X(j1,k1) \quad (6)$$

Furthermore, a transposition is performed with the following equation (7) in order to change to a matrix representation $A(0:q-1, 0:p-1)$ of $a_{k1+q\times k2}$ as a third step.

$$A(k1,j1)=X(j1,k1) \quad (7)$$

Then, a Fourier transform of a length p is performed with the following equation (8) as a fourth step.

$$A(k1, k2) = \sum_{j1=0}^{p-1} A(k1, j1) \times \exp(-2\pi i(j1 \times k2)/p) \quad (8)$$

The above described steps are included in the 4-step algorithm. The preferred embodiments according to the present invention assume that a fast Fourier transform is performed based on this 4-step algorithm.

Namely, the 4-step algorithm calculates the fast Fourier transform with a process composed of 4 steps by regarding one-dimensional data as two-dimensional data of an input P×Q and an output Q×P when the number of pieces of data N can be resolved into the product of P and Q.

first step: Performing a one-dimensional Fourier transform of a length Q by P times second step: Multiplying each element after the Fourier transform by a twiddle factor.

third step: Transposing a matrix of P rows and Q columns to a matrix of Q rows and P columns.

fourth step: Performing a one-dimensional Fourier transform of a length P by Q times.

This 4-step algorithm is described in the following document. In this document, the 4-step algorithm is not named, but its contents are described at the beginning of 2. Existing FFTs.

P. N. Swarztrauber, "Multiprocessor FFTs", Parallel Computing 5. pp.197-210, North-Holland (1987)

As modifications of such a 4-step algorithm, the following three types are considered. As the first type, a method setting the value of Q to 2 in each step if the number of pieces of data N is represented by a power of 2, namely $2^n$, and performing a matrix transposition once at the end is considered. It is known that the transposition to be performed last can be executed with displacement called "bit reverse" at this time. The value of the radix Q is set to a number larger than 2, such as 4, 8, 16, etc., in order to make the bit reverse effective, so that the computation density for a data access can be improved.

As the second type, a method making a calculation by applying the 4-step algorithm in a similar manner if N is represented by the product of powers of representative radixes is considered. With this method, another working region is prepared in a matrix transposition, and transposition results are written to this working region in one phase of the 4-step algorithm recursively executed as will be described later, and a calculation is continued while replacing input and output regions by using the working region, namely, the output region as an input in the next phase.

As the third type, there is a method making a calculation by representing N with some representative radixes similar to the second type, but making a comprehensive matrix transposition once at the end.

The following conditions must be considered to make a fast Fourier transform fast, although they are not directly related to a type distinction in such a fast Fourier transform. As a first condition, a process is executed so that accesses to data become sequential in each phase. As a second condition, a table is configured so that accesses to the trigonometric function table for storing twiddle factors used in the second step of the 4-step algorithm become sequential. As a third condition, a radix is made suitably large to make a computation density for an access high. As a fourth condition, the number of accesses to the trigonometric function table is reduced.

According to the present invention, the number of accesses to the table is reduced by calculating some of required twiddle factors beforehand and storing calculation results in the table, and by calculating remaining twiddle factors with recurrence equations during a time period required to load data.

A fifth condition is to control the transform so that data of a calculation result is made reusable.

A sixth condition is to perform the transform with a recursive method in order to enable data used in the transform to be held in an L1 cache closest to the CPU.

Up to this point, the 4-step algorithm of the fast Fourier transform is described. Preferred embodiments according to the present invention, which fundamentally use this 4-step algorithm, are described next. FIG. 2 is a flowchart showing the whole of a 2-radix Fourier transform process as a first preferred embodiment according to the present invention. The first preferred embodiment fundamentally corresponds to the above described first type.

Once the process is started in FIG. 2, firstly, the number of pieces of data N is resolved into the product of m factors N1, N2, ..., Nm in step S10. In step S11, it is determined whether or not the process is initially called to create a trigonometric function table. If a corresponding table is already created, the process immediately goes to a process in step S13. If the corresponding table is not created, a trigonometric function table creation process is executed in step S12.

In the trigonometric function table creation process, the following processes in (1) and (2) are repeated by m−1 times after the number of pieces of data N is first assigned to Nt, and a repetition number k is initialized to 1.

1) Storing $\omega^j$(j=1, ..., Nt/Nk) in the table by setting $\omega$=exp (2πi/Nt).

2) If k is not equal to m−1, Nt=Nt/Nk is set, the value of k is incremented, and the processes in and after
   (1) Are Repeated.

FIG. 3 shows twiddle factors to be multiplied with Fourier transform results of data in the Fourier transform in each phase, which will be described later, in correspondence with data stored in an array of P rows and Q columns. Namely, twiddle factors to be multiplied with each piece of data as results of the Fourier transform in each phase, which will be described later, are shown in correspondence with positions within the array by assuming that Nk=N1 is first set in (1) in the table creation process, N resolved into a product is separated into a product of N1 and remaining factors, and N=P×Q, which is resolved into Q=N1 and P=N2× . . . ×Nm, in step S10. That is, for data of transform results in the first row and the first column, only 1 is multiplied, and the results remain unchanged. For the second row or the second column, $\omega^0=1$, $\omega, \omega^2, \omega^3 \ldots \omega^{Q-1}$, or $1, \omega, \omega^2, \omega^3 \ldots \omega^{P-1}$ are multiplied with the respective transform results of the data.

Figure 4:
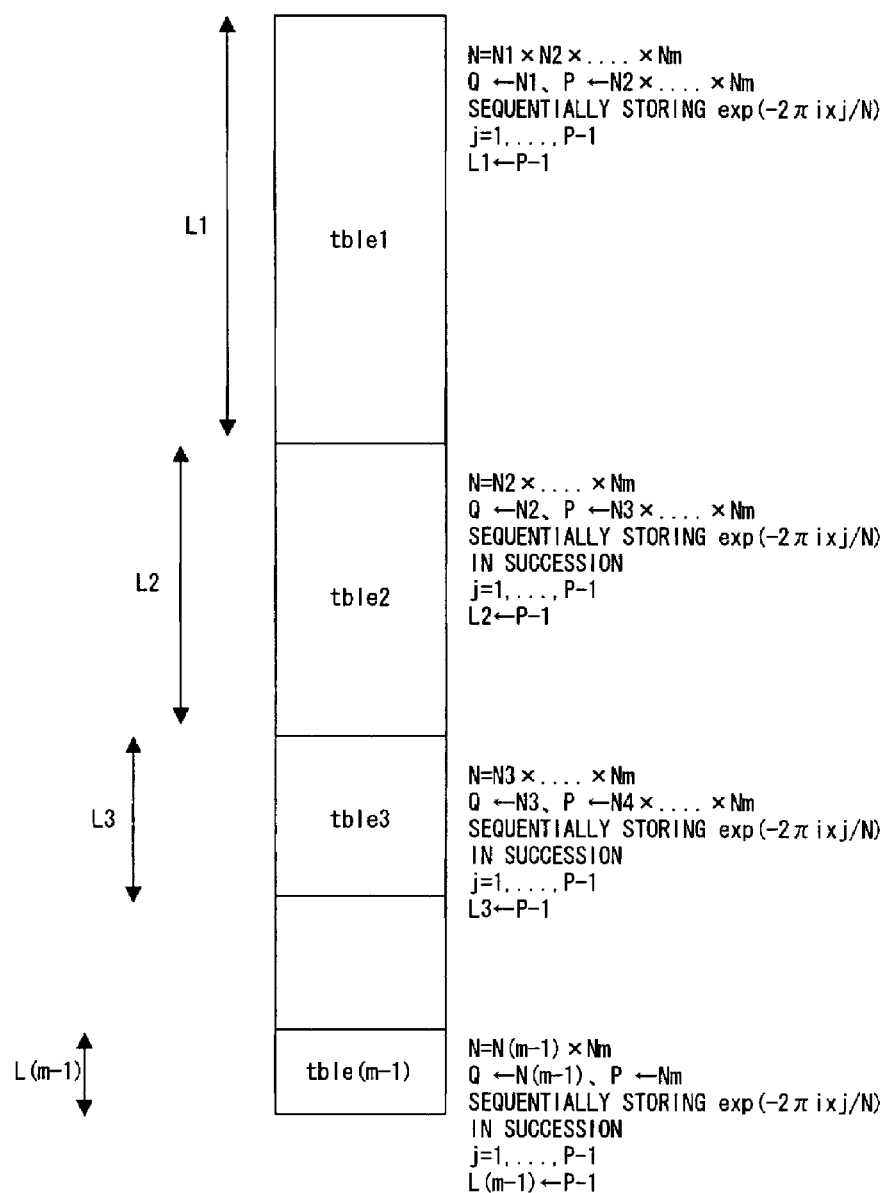
FIG. 4 explains a storage format of twiddle factors in a trigonometric function table.

Accordingly, in this preferred embodiment, values from $\omega$ in the second row to $\omega^{P-1}$ in the Pth row are calculated as twiddle factors to be multiplied with data of transform results in the second column, and calculation results are stored in a one-dimensional array table tble1 of a complex number type. This storage format is shown in FIG. 4. Namely, in FIG. 4, P−1 pieces of data of a complex number type are stored by a length L1 in the initial table tble1 of one-dimensional array tables. Contents of this table tble1 are used in the first phase to be described later.

Next, the process in (1) is executed after the product of remaining factors, which is obtained by excluding N1 from the number of pieces of data N, is set to Nt, and the value of k is set to 2 in the above described (2). Here, twiddle factors stored in this table are used in the second phase of the respective m phases in total, which will be described later. Since the value of Nt becomes small and the unit of an angle separating $2\pi$ becomes large in comparison with the first phase, non-sequential accesses are required if the values of the twiddle factors stored for the first phase are used unchanged. To make accesses sequentially, a process for calculating twiddle factors to be multiplied with the third column of the data in the array corresponding to FIG. 3 after the Fourier transform in the second phase, and for storing the calculated factors in a tble2 of FIG. 4.

Namely, after the process for creating tble1, P is assigned to Nt, and twiddle factors, which are required when Q) and P are respectively set to N2 and N3× . . . ×Nm, are calculated and stored in the tble2 shown in FIG. 4. Its length L2 is shorter than the length L1 of tble1, as a matter of course.

A similar process is continued thereafter. In an (m−1)th process in step S12 of FIG. 2, a calculation, which will be described later, of twiddle factors to be used in an (m−1)th phase being the second last to be described later, by respectively setting the product of N(m−1) and Nm, N(m−1), and Nm as Nt, Q, and P. Then, calculation results are stored in tble (m−1) shown in FIG. 4, and the process in step S12 is terminated. For example, N(m−1) is the same as $N_{m-1}$ in the description of FIG. 1.

In step S13 of FIG. 2, the value of k is again initialized to 1, and the processes in steps S14 to S16 are continued until the value of k reaches m. step S14 is (a subroutine of) the Fourier transform process in each phase, and its details will be described with reference to FIG. 5. If it is determined in step S15 that the value of k, which indicates the number of phases, does not reach m, the value of k is incremented in step S16. Then, the process for the next phase is executed in step S14. When it is determined in step S15 that the number of phases reaches m, rearrangement using the bit reverse is made instep S17, and the process is terminated. Namely, with the type 1, a collective matrix transposition is once executed at the end in the rearrangement using the bit reverse as described above. In correspondence with this, results of multiplying twiddle factors are bit-reversed beforehand and stored in the Fourier transform of each phase as will be described later.

Figure 5:
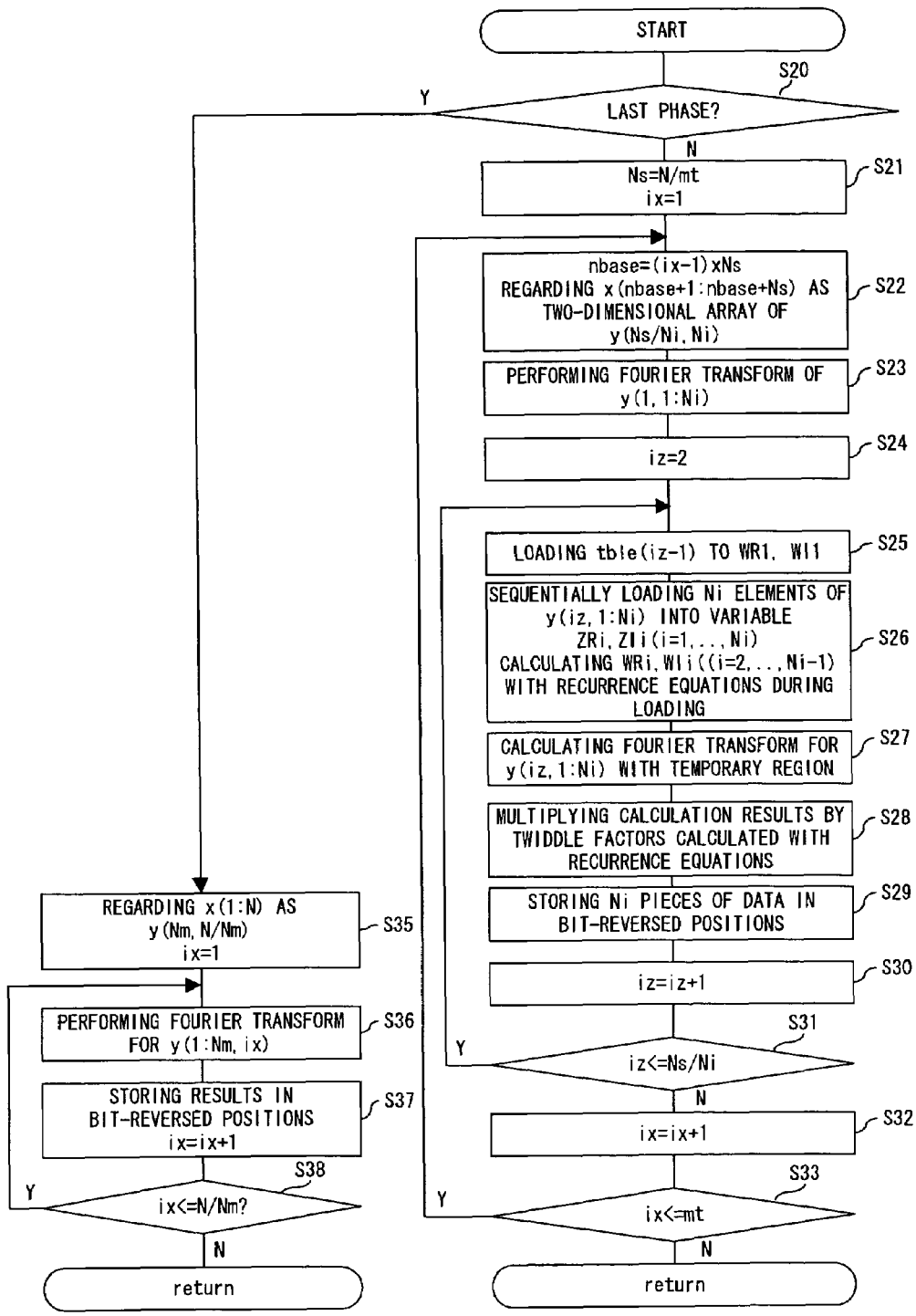
FIG. 5 is a flowchart showing the details of a Fourier transform process in each phase in FIG. 2.

FIG. 5 is a flowchart showing the details of the Fourier transform process in each phase in step S14 of FIG. 2. This process is executed with the table for storing required twiddle factors in each phase, for example, tble1 in the first phase.

Once the process is started in FIG. 5, it is first determined in step S20 whether or not a current phase is the last phase, namely, the last mth phase as explained in step S15 of FIG. 2. The multiplication of twiddle factors is not required in the last phase, and a process is different from that executed until an (m−1)th phase. Therefore, the flow transfers to the process in step S21 if the current phase is not the last phase.

In step S21, a value, which is initially 1 and thereafter obtained by dividing N by a multiplicity mt obtained by multiplying a radix $N_{i-1}$ of a preceding transform each time a phase advances, is set as a length Ns of the Fourier transform to be calculated by applying the 4-step algorithm, and the value of ix is initialized to 1. Additionally, ix indicates a column index. If its value is 1, it indicates the first column.

In step S22, the value of nbase is obtained with the values of Ns and ix. Here, since the value of ix is 1, nbase becomes 0. A one-dimensional array x having a length Ns, which starts at nbase+1, is regarded as a two-dimensional array y. The format of this two-dimensional array is shown in FIG. 6.

The one-dimensional array x(1:Ns) is regarded as the two-dimensional array shown in FIG. 6, namely, a two-dimensional array of Ns/Ni rows and Ni columns.

Then, in step S23, a Fourier transform for the first row of this two-dimensional array, namely, y1 (1,1:Ni) is performed. Since this data is the data of the first row, the process for multiplying results of the Fourier transform by twiddle factors is not required. In step S24, iz, which is an index for indicating a row of the two-dimensional array and indicates a data storage position in the trigonometric function table described with reference to FIG. 4, is set to 2. Then, processes in steps S25 to S31 are repeated until the value of iz exceeds the value of Ns/Ni. Namely, in FIG. 6, the process for each row of the two-dimensional array is repeated from the second row to the last (Ns/Ni)th row.

In step S25, the trigonometric function table described with reference to FIG. 4 is referenced. Firstly, the data of the complex number type, which is stored in the uppermost part of the top table tble1, is loaded. Namely, real and imaginary parts of iz−1=1st data in tble1 are respectively loaded to WR1 and WI1. Next, in step S26, the real and imaginary parts of elements of the two-dimensional array y(iz,1:Ni), here Ni elements of the second row are respectively loaded to ZRi and ZIi (i=1, . . . , Ni).

As described with reference to FIGS. 3 and 4, in the trigonometric function table shown in FIG. 4, the twiddle factors to be multiplied with the results of the Fourier transform of the data of the second column in the array shown in FIG. 3 are stored in tble1 shown in FIG. 4. Namely, the twiddle factors loaded in step S25 correspond to $\omega$ in the second row and the second column of FIG. 3. The twiddle factors to be multiplied with data in the third and subsequent rows in the second column after the Fourier transform are calculated with recurrence equation while this data is being loaded in this preferred embodiment. As the recurrence equations for this calculation, the following equations (9) and (10) are used.

$$WI(i+1) = WIi \times WR1 + WRi \times WI1 \quad (9)$$

$$WR(i+1) = WRi \times WR1 - WIi \times WI1 \quad (10)$$

where WR1 and WI1 are respectively the real and the imaginary parts of the twiddle factor $\omega$ loaded in step S25. By repeating the calculations of the equations (9) and (10), $\omega^2$, $\omega W^3$ . . . in the second row of FIG. 3 are calculated one after another. These recurrence equations correspond to an addition theorem of a trigonometric function.

Then, in step S27, the Fourier transform for y(iz,1:Ni), here the data of the second row of FIG. 6 is calculated with a temporary working region. In step S28, twiddle factors calculated with the recurrence equations are multiplied with the calculation results. In step S29, Ni pieces of data as the multiplication results are stored in bit-reversed positions. Here, the reason why the data are stored by being bit-reversed is that the bit reverse corresponding to a transposition is performed at the end in the type 1 as described above, and accordingly, the Fourier transform results multiplied by the twiddle factors are stored in the bit-reversed positions beforehand in order not to be inconsistent with the bit reverse.

In step S30, the value of iz as the index of a row of the two-dimensional array y is incremented. In step S31, it is determined whether or not that value exceeds Ns/Ni, namely, the number of rows of the two-dimensional array y. If the value does not exceed the number of rows, the processes in and after step S25 are continued for the third and subsequent rows of the two-dimensional array y. In this process, the processes in and after step S26 are executed in a similar manner as for the second row, for example, after corresponding contents in the trigonometric function table tble1 described with reference to FIG. 4 are loaded to WR1 and WI1 in step S25.

If it is determined in step S31 that iz exceeds the value of Ns/Ni, the index ix of a column of the array of the data arranged in the same way as in FIG. 3 is incremented in step S32. In step S33, it is determined whether or not the value of the index exceeds the multiplicity mt. If the value of the index does not exceed the multiplicity, the processes in and after step S22 are repeated.

In this repetition process, the value of ix first becomes 2, so that the value of a base pointer nbase becomes Ns, and the range of a one-dimensional array x becomes a range from Ns+1 up to a double of Ns. Namely, in the data array corresponding to FIG. 3, the one-dimensional array x, which is specified as a position of an order from the top to the bottom of the first column, and then the top to the bottom of the second column, becomes the position of the second column, and the one-dimensional array of the second column is regarded as a two-dimensional array y. Then, the processes in and after step S23 are repeated for that two-dimensional array.

Then, in step S33, the flow returns when ix exceeds mt, namely, all of the calculations for the corresponding radix are determined to be terminated. Then, the flow transfers to the process in step S15 of FIG. 2.

If it is determined in step S20 of FIG. 5 that the phase is the last phase, the Fourier transform for the one-dimensional array x(1:N) of the data is performed without multiplying twiddle factors. Namely, in step S35, the one-dimensional array x is regarded as a two-dimensional array y(Nm, N/Nm), and a one-dimensional Fourier transform of a length Nm are performed by N/Nm times.

Namely, the Fourier transform for the column specified by the index ix=1 in the two-dimensional array y, here the first column is performed in step S36 after the value of the column index ix is set to 1. In step S37, results of the Fourier transform are stored in bit-reversed positions in order to correspond to the last bit reverse as described above, and the value of ix is incremented. In step S38, it is determined whether or not the value of ix exceeds the number of columns, namely, N/Nm. If the value of ix does not exceed N/Nm, the processes in and after step S36 for the second and subsequent columns of the two-dimensional array y are repeated. When it is determined in step S38 that all of the processes for the two-dimensional array are determined to be terminated in step S38, the flow returns to the process of FIG. 2, and the processes in and after step S15 are repeated.

Here, the above described processes are further described using the concept of a three-dimensional array. In the process of the last phase, elements are displaced with the bit reverse of subscripts of elements. Therefore, a transposition is not performed when the 4-step algorithm is repeated applied. This repetition process is as follows.

Assume that a data length can be resolved into N=N1× N2× . . . Nm in accordance with the flowchart. (1) Executing the process by considering Q=N1 and P=N2× . . . ×Nm of N=P×Q, and R=1, and by regarding X(N) as a third-dimensional array W(P,Q,R). In this process, the Fourier transform of a length Q is performed by P times, and twiddle factors are multiplied before results of each Fourier transform are stored. The results are stored in an order of being bit-reversed for the length Q.

In the fourth step of the 4-step algorithm, the Fourier transform is performed for data of the length P in the second dimension. When the Fourier transform of the length P can be performed, twiddle factors are multiplied with the results in the second step. However, the transposition in the third step is not performed here. Since the bit-reverse is made collectively at the end, the transposition is not performed, and in order to make the bit-reverse work properly, transform results of the radix Q are changed in an order where the bit reverse is performed for the transform of the length Q, and stored. This is because the value of the radix Q is a predetermined value, and storage positions are proved. Therefore, programming is performed so that the results are stored in those positions.

Since the transposition is not performed in the Fourier transform of the length P in the fourth step, the Fourier transform may be performed for the data in the first dimension. Therefore, the 4-step algorithm is considered to be again applied to the Fourier transform for the data of the length P to make a calculation. Accordingly, an array such that the first dimension is separated into two dimensions, and the third dimension becomes a multiplicity can be considered. Based on this concept, Q, P, and R are updated and the calculation is made by considering a structure as W(P,Q,R). R corresponds to the above described multiplicity mt.

Next, the process is executed for each R by making Q?N2, P?N3× . . . ×Nm, R?N1, and by considering the whole structure as W(P,Q,R) after making a replacement N?P without performing a transposition.

Contents of the process are the same as the procedures in the first phase. The process is executed for each R by making Q?N2, P?N3× . . . ×Nm, and R?N1×N2, and by regarding the whole structure as W(P,Q,R) after making a replacement N?P. These procedures are repeated, and the process is executed for each R by setting N=N(m−1)×Nm, Q=N(m−1), P=Nm, and R=N1×N2× . . . ×N(m−2) in the second last phase. Contents of the process are the same as the procedures in the first phase.

(2) In the last phase, the process is executed for each R of W (Nm,1,R) by separately making R?N1×N2× . . . ×N(m−1).

For the process in (1), namely, the process from the first phase to the second last phase, the Fourier transform of the length Q is performed by P times for each R by regarding the one-dimensional array as the three-dimensional array W(P,Q, R), and twiddle factors are multiplied before results of each Fourier transform are stored. The results are stored in an order where the bit reverse is performed for the length Q. The base pointer nbase is updated by adding Ns (the value of N updated with each repetition during the process in (1)) to nbase each time R is incremented by 1.

The region of X (nbase+1:nbase;Ns) is W(1:P,1:Q,R) as a region, and this is regarded as y(Ns/Ni,Ni). (2) Lastly, the Fourier transform of a radix Nm is performed for each R of W(R,1,Nm) or Z(R,1,Nm) by separately making R?N1×

N×...×N(m−1). If an input is the array W, transform results are stored in W. If the input is the array Z, the results are stored in the same positions as those of the array W. Up to this point, the calculation is terminated.

The description of the flowcharts according to the first preferred embodiment of the present invention is completed. The speed of the process can be improved in this preferred embodiment because the need for accessing the trigonometric function table is eliminated. Namely, for example, the data of the complex number type in the uppermost portion of tble1 is loaded from the trigonometric function table shown in FIG. 4, and twiddle factors required for the calculation of the same row of the two-dimensional array y are calculated by using the recurrence equations, as described above in step S26. Therefore, there is no need for accessing the trigonometric function table.

Additionally, the radix of the Fourier transform is not set to 2, but increased to a large number such as 4, 8, 16, etc., whereby also a computation density for a data access can be improved. For example, increasing the radix to 8 corresponds to setting the value of Ni to 8 in the flowchart. Also setting the radix to 4 or 16 is similar. Actually, instruction scheduling is performed in a hardware manner in order to improve the speed of the processes, a compiler generates an instruction in consideration of the scheduling, and the hardware can dynamically make calculations if they are possible.

Figure 7:
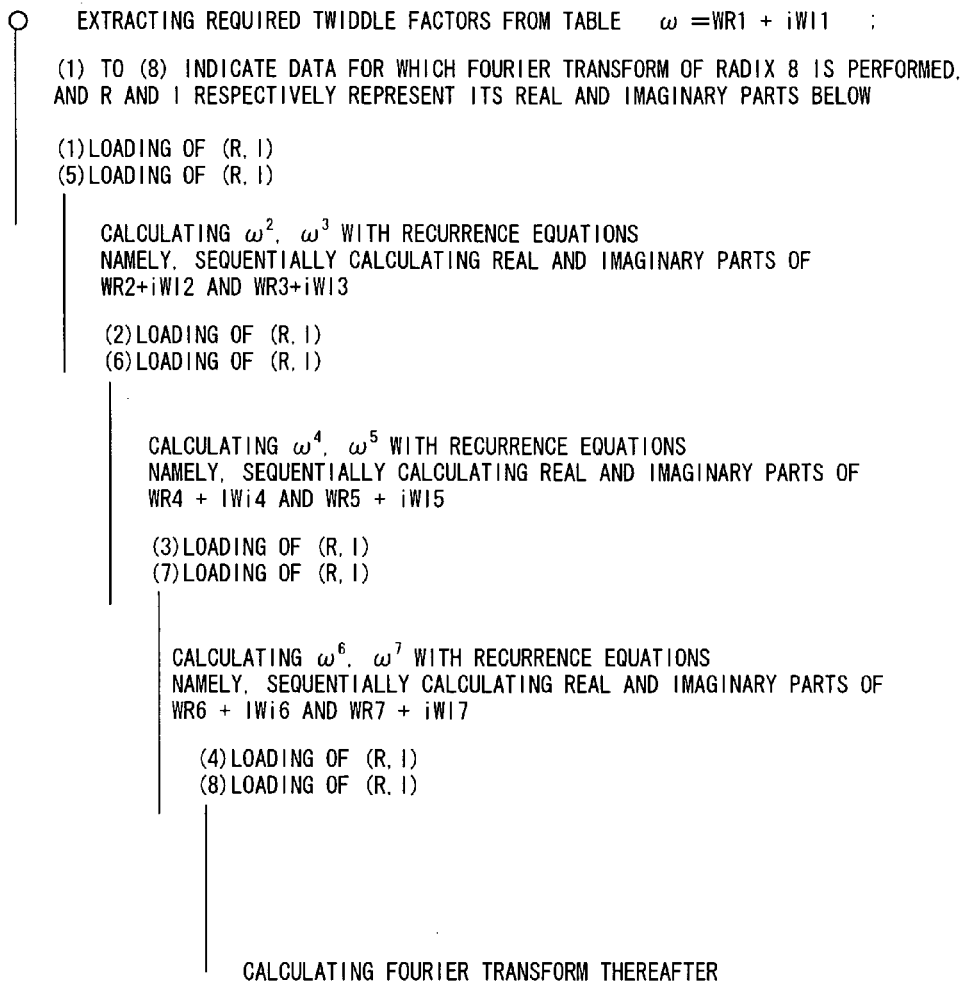
FIG. 7 shows the flow of data loading and a twiddle factor calculation in a first preferred embodiment.

FIG. 7 shows the flow of the process executed in the preferred embodiment 1. This figure shows the flow of the extraction of twiddle factors for performing the Fourier transform by setting a radix to 8, and a calculation using the recurrence equations for data (1) to (8). Firstly, twiddle factors ω in the second row and the second column in the form of the array shown in FIG. 3 are extracted from the trigonometric function table. At the same time, real and imaginary parts of two pieces of data (1) and (5) are loaded. In the second row of FIG. 3, i corresponds to 1. When $\omega^2$ and $\omega^3$ are calculated next with the recurrence equations, data (2) and (6) are loaded simultaneously. A similar process is repeated, and a Fourier transform calculation is performed thereafter. Then, a multiplication of corresponding twiddle factors is made for the results.

As a result, the number of accesses to the trigonometric function table is reduced to only 1, and a calculation of required twiddle factors by using the recurrence equations is made from the data extracted with the access while the data is loaded. Consequently, the amount of data stored in the trigonometric function table can be reduced to approximately 1/(Q−1).

In FIG. 7, the process is executed by regarding a one-dimensional array of a data length 8 as a two-dimensional array V(4,2). Namely, data (1) to (4), and data (5) to (8) are respectively stored in the first and the second columns. Then, the process is executed in an order where the data of (1) and (5) are first extracted, and the data of (2) and (6) are next extracted to sequentially extract the data of the two-dimensional array from the first row.

Figure 8:
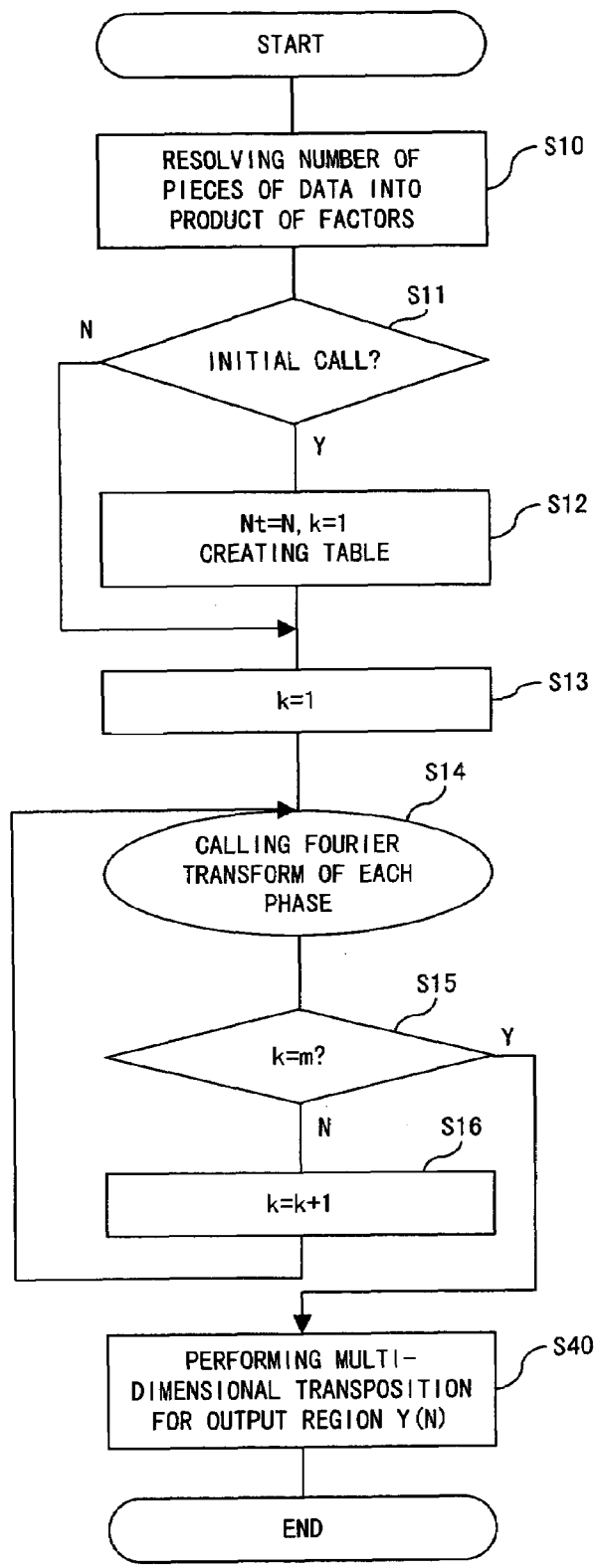
FIG. 8 is a flowchart showing the whole of a Fourier transform process in a second preferred embodiment.
Figure 9:
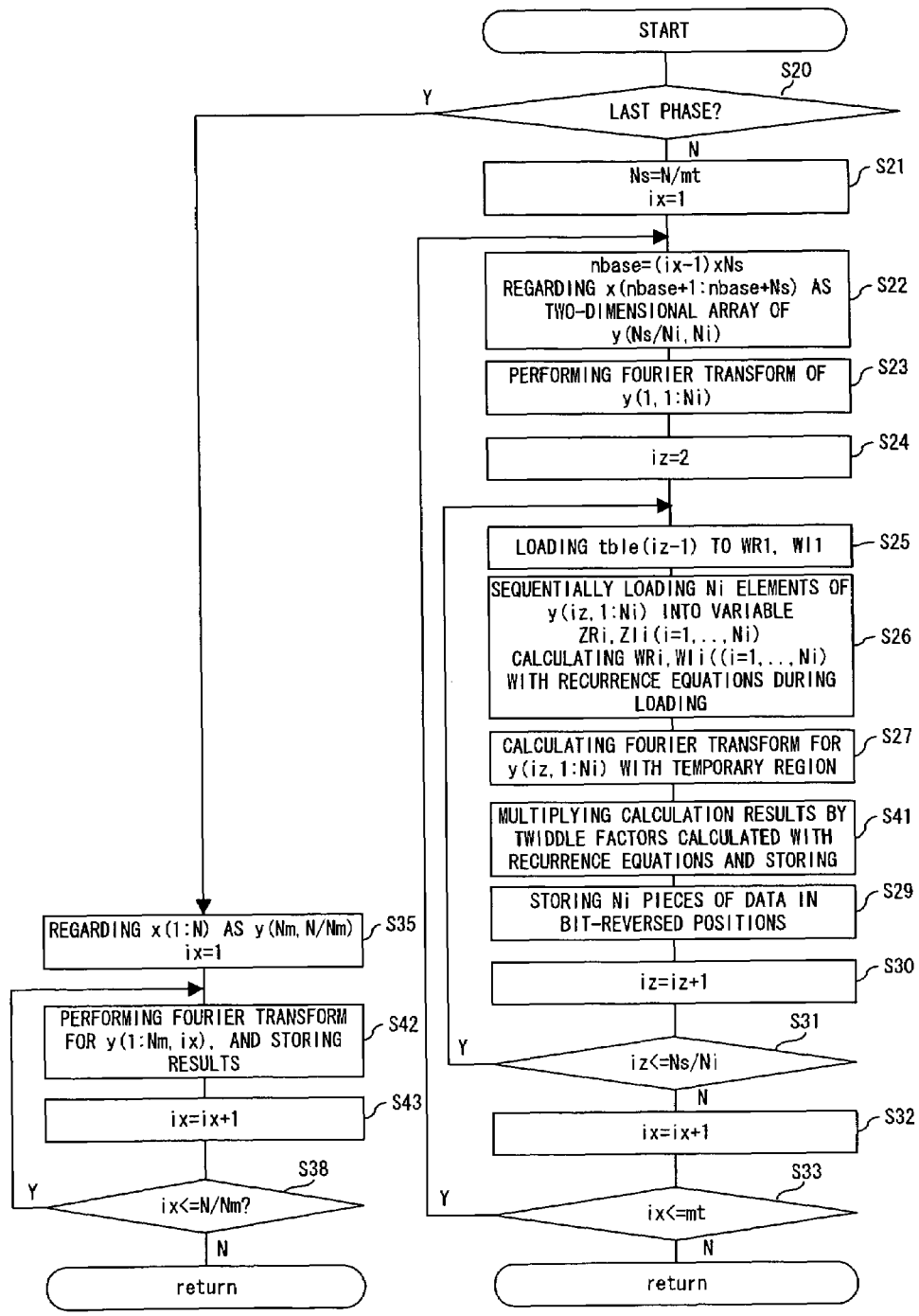
FIG. 9 is a flowchart showing the details of the Fourier transform process in each phase in the second preferred embodiment.

A second preferred embodiment according to the present invention is described next. The second preferred embodiment corresponds to the above described type 3, and is a method collectively making a matrix transposition at the end. FIG. 8 is a flowchart showing the whole of a Fourier transform process in the second preferred embodiment, whereas FIG. 9 is a flowchart showing the details of the transform process in each phase.

Comparing the flowchart showing the whole of the process in the second preferred embodiment in FIG. 8 with that in the first preferred embodiment in FIG. 2, the processes from the start to step S16 are the same except for a difference existing in a point that a multi-dimensional transposition is made for an output region Y(N) in step S40 instead of the rearrangement using the bit reverse in the last step S17. As this transposition, the following transposition is repeatedly performed for all of I=1, ... ,N.

Determining Im, ... , I1 (0≦Ii≦Ni−1), which satisfies $I=Im+I(m-1)\times Nm+...+I2\times(Nm\times N(m-1)\times...\times N3)+ I1\times(Nm\times N(m-1)\times...N2)+1.$ $K=I1+I2\times N1+...+I(m-1)\times(N1\times N2\times...\times N(m-2))+ Im\times(N1\times N2\times...\times N(m-1)+1$ $Y(K)=X(I)$ Here, each Ii is obtained as follows.
1) Setting J=I−1.
2) DO t=m, 1, −1
3) It=mod(J,Nt)
4) J=I/Nt
5) ENDDO K can be obtained as follows by using the obtained It(t=1, ... m).
1) K=I1+1, U=1
2) DO t=2,m
3) s=t−1
4) U=U×$N_s$
5) K=K+It×U
6) ENDDO Comparing the flowchart showing the details of the Fourier transform process in each phase in FIG. 9 with that in the first preferred embodiment in FIG. 5, the process for the phases other than the last phase is the same except for a difference existing in a point that twiddle factors are stored unchanged without performing the bit reverse as in step S29 in the process for multiplying calculation results of the Fourier transform by the twiddle factors calculated with the recurrence equations in step S41, which corresponds to step S28 Also in the process in the last phase, a difference exists in a point that results of the Fourier transform are stored unchanged without performing the bit reverse as in step S37 in step S42, which corresponds to step S36, and that the index ix is incremented in step S43, which corresponds to step S37

Figure 10:
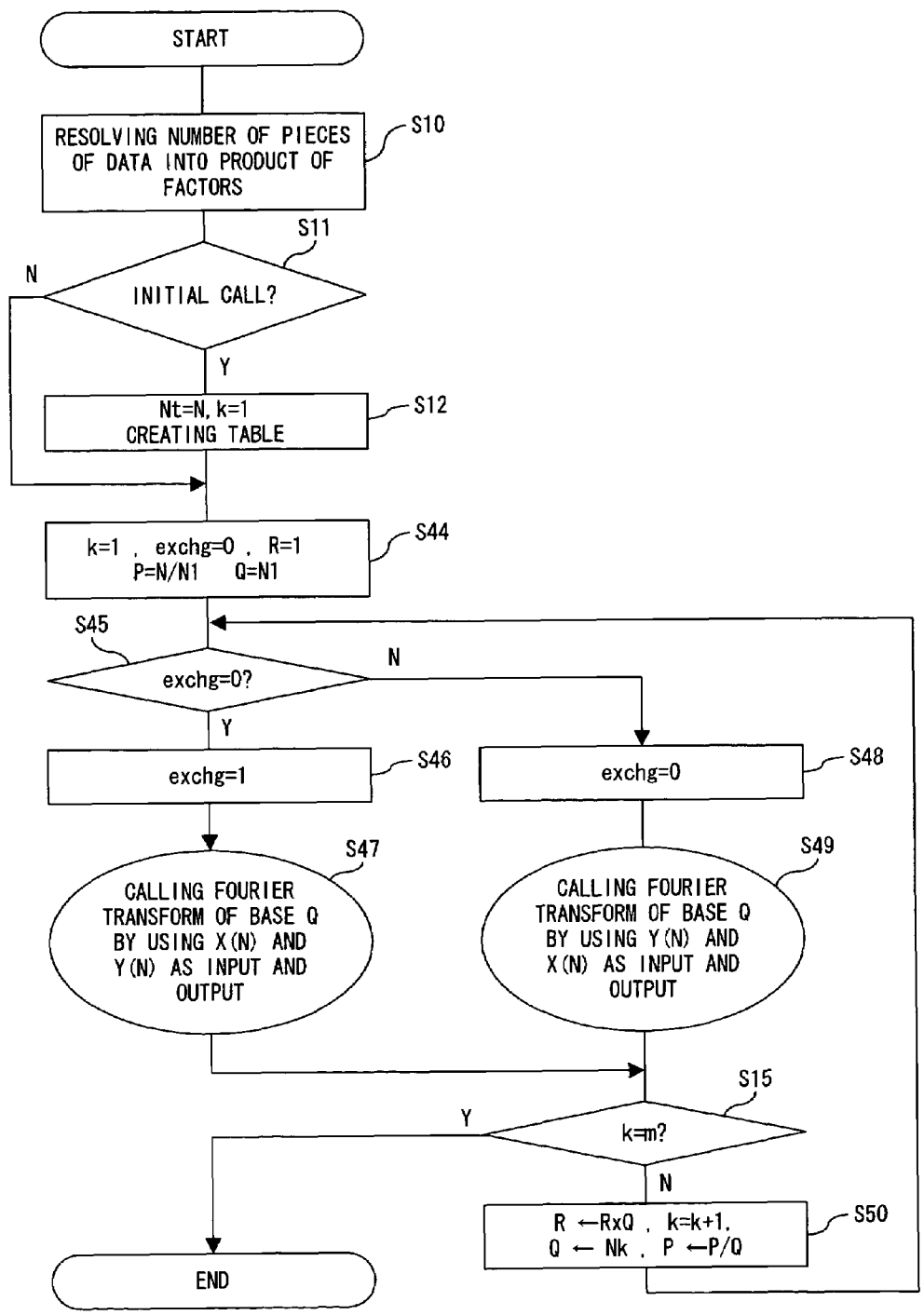
FIG. 10 is a flowchart showing the whole of a Fourier transform process in a third preferred embodiment.

FIG. 10 is a flowchart showing the whole of a process in the third preferred embodiment. This third preferred embodiment corresponds to the above described type 2. In this process, a transposition for outputs result of a Fourier transform process in each phase is performed by being written to another working region, and the calculation is continued by replacing output and input regions in the next phase.

Processes in steps S10 to S12 in FIG. 10 are the same as those in the first preferred embodiment in FIG. 2. However, the flow transfers to a transform process in each phase basically after the value of k is set to 1, the value of exchg indicating whether or not input and output regions are replaced is set to 0, and R, P, and Q in a three-dimensional array to be described later are respectively set to 1, N/N1, and N1 in step S44, which corresponds to step S13.

Succeeding step S44, it is determined in step S45 whether or not the value of exchg, which indicates if input and outputs regions are replaced, is 0, namely, in a state of not being replaced. If the regions are not replaced, the Fourier transform process in each phase is performed in step S47 after the value of exchg is changed to 1 as in step S46, namely, a replaced state. In step S47, X(N) and Y(N) are used as an input and an output, and a corresponding portion of the trigonometric function table for storing twiddle factors, and the values of R, P, and Q of the three-dimensional array are passed to a subroutine, and the Fourier transform of the radix Q is performed.

If the value of exchg is not 0 in step S45, namely, 1, the Fourier transform process in each phase is performed in step S49 after the value of exchng is set to 0 in step S48. Here, unlike step S47, Y(N) and X(N) are used as an input and an output, and the Fourier transform of the radix Q is performed in a similar as in step S47.

Then, in step S15, it is determined whether or not the value of k reaches m in a similar manner as in FIG. 2. If the value of k does not reach m, the product of R and Q, Nk, and P/Q are respectively assigned to R, Q, and P, and the value of k is incremented in step S50. Then, the processes in and after step S45 are repeated. The process is terminated at a time point when the value of k is determined to reach m in step S15.

The process in each phase in the third preferred embodiment is described. The case where the number of pieces of data can be resolved into N1×N×...×Nm is considered as in the above described embodiments.

The 4-step algorithm is repeated and recursively applied and also a transposition is performed. Another array region is prepared to perform a transposition. Arrays X (N) and Y (N) are used as input and output sides. The process is executed by replacing input and output regions each time a phase is repeated. The process in the last phase does not require a transposition. If the input region is a region used as the input in the first phase, the calculation is made in that region. If the input side region of the process in the last phase is a region used as the output in the first phase, results are written to the other region. In this way, results of the Fourier transform are stored in the region initially used as the input region, and the region initially used as the output can be used as a working region.

The repetition process becomes as follows.

The process is executed by considering Q=N1, and P=N2×...×Nm of N=P×Q, and R=1, and by regarding X(N) as a three-dimensional array W (R, P, Q). In this process, the Fourier transform of a length Q is performed by P times, and twiddle factors are multiplied before the results of each Fourier transform are stored. As the output, Y (N) is stored in Z (R, Q, P). The Fourier transform is performed for W(r1,p1,1:Q), transform results are multiplied by twiddle factors, and multiplication results are stored in Z(r1,1:Q,p1), for which a transposition is performed. Required twiddle factors are calculated with the recurrence equations by referencing the table, and the results are multiplied by the calculated twiddle factors in a similar manner as in the first preferred embodiment. Unlike the first preferred embodiment, results of the Fourier transform of the radix Q are not stored in an order of the bit reverse (because the 4-step algorithm is faithfully executed). Upon completion of the Fourier transform of the length Q for all of combinations of p1 and r1, the process for a second radix N2 is executed. Initial results are stored in Z (R, Q, P). The Fourier transform of data having the length P in the fourth step of the 4-step algorithm is performed. The Fourier transform is applied to Z(r1,q1,1:P). To recursively apply the 4-step algorithm to P, the number of pieces of data is resolved into P×Q by making Q?N2/P?N3 ×...×Nm, and R?N1 after making a replacement N?R. Y(N) is used as an input. A calculation is made by regarding Y as a three-dimensional array Z(R,P,Q) as an input, and by regarding X(N) as an output region. The transform of the length Q is performed for Z(r1,p1,1:Q) similar to the beginning. After calculation results are multiplied by twiddle factors, multiplication results are stored in W(r1,1:Q,p1), for which a transposition is performed. Such a calculation is made for all of combinations of r1 and p1.

Next, the input and the output are again replaced, and the Fourier transform of the length P at this time is calculated by recursively applying the 4-step algorithm. To implement this, the transform of the radix Q is performed by making Q?N2, P?N3×...×Nm, and R?N1×N2, and by considering the whole structure as W(R,P,Q) after making N?P. Transform results are multiplied by twiddle factors, and multiplication results are stored in Z (R,Q,P). Such a calculation is repeated, and the process is executed by considering N=N (m−1)×Nm, Q=(m−1), P=Nm, and R=N1×N2...×N(m−2) in the second last phase. Contents of the process are the same as the procedures in the initial phase.

Figure 11:
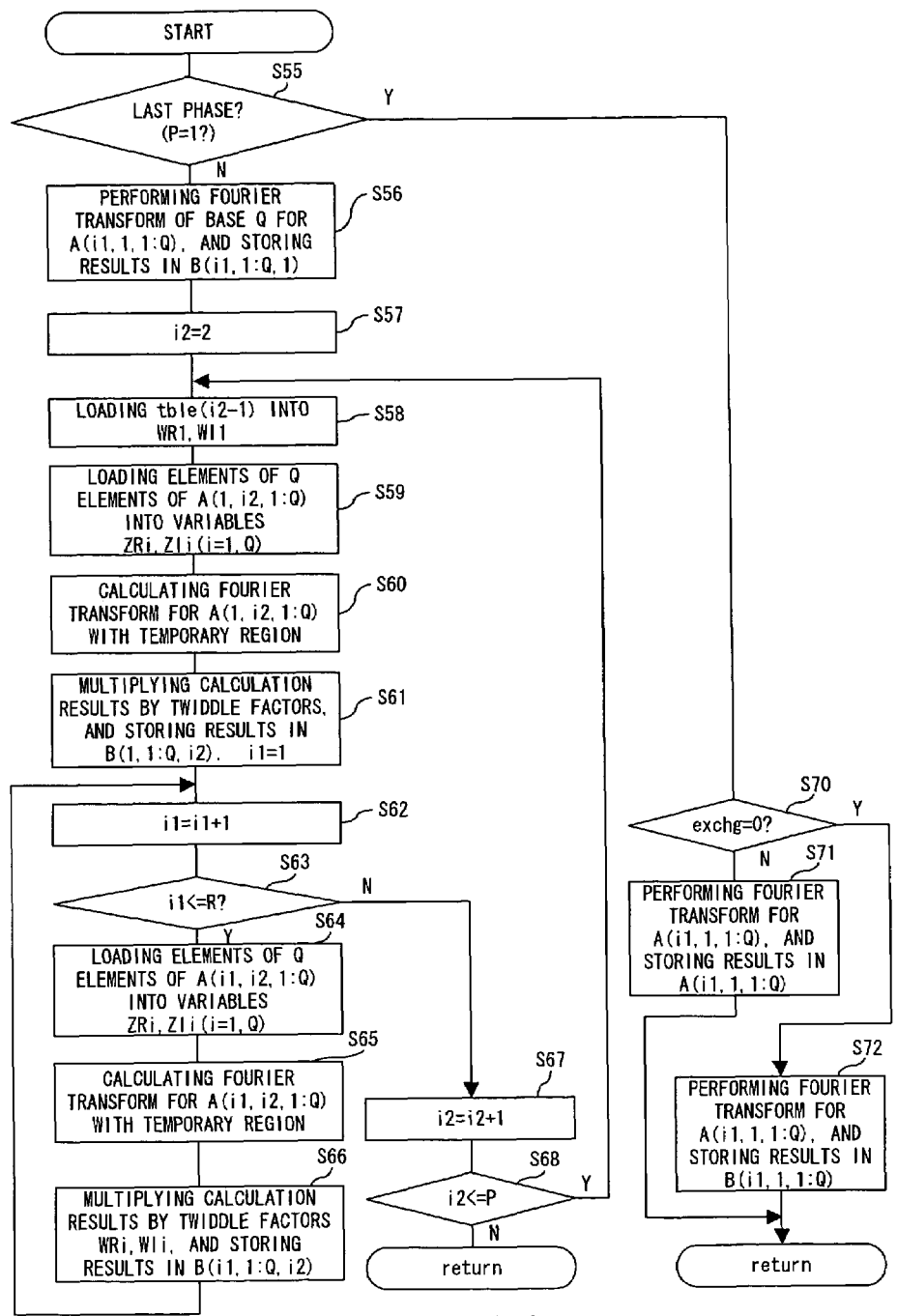
FIG. 11 is a flowchart showing the details of the Fourier transform process in each phase in the third preferred embodiment.

FIG. 11 is a flowchart showing the details of the Fourier transform process in each phase in the third preferred embodiment. This flowchart is a flowchart in the case of the above description, namely, a case where the process is executed by preparing two array regions, and by replacing input and output regions each time a phase is repeated. Although detailed description for each step is omitted, a supplementary description is provided below.

Prior to the start of the process, two three-dimensional array regions A(R,P,Q) and B(R,Q,P) are received, a required trigonometric function table, namely, a table for storing twiddle factors, and the values of R, P, Q, and exchg are received as an input. Then, the process is started.

A process in step S56 is executed for each of i1=1,...,R. Additionally, twiddle factors are calculated using the recurrence equations during a process in step S59 in a similar manner as in step S26 of FIG. 5.

A determination made in step S63 is made to calculate a remaining A(2:R,P,Q) in the first dimension so that A(R,P,Q) is accessed from the first dimension to the second dimension, and the third dimension if R is larger than 1. Also processes in steps S71 and S72 are respectively executed for all of i1=1,...,R.

This flowchart does not require the rearrangement using the bit reverse. Therefore, a radix is not limited to the value of the power of 2. Even if the radix is not a number being the power of 2, such as 3, 5, 7, .... this process is applicable and is a more general-purpose method.

As described above, the one-dimensional Fourier transform program according to the present invention is described in detail. This program is used as a component, whereby a multi-dimensional Fourier transform can be also performed. For example, with a three-dimensional transform, a transform process for the first dimension is executed by fixing the second and the third dimensions. A process for the second dimension corresponds to an access made on a plane. Therefore, by way of example, an access is made in a direction vertical to the direction of the first dimension already calculated, whereby the calculation results of the first dimension can be also used.

The Fourier transform method according to the present invention is applicable to all of industries that require an analysis using a Fourier transform, for example, industries associated with technical fields such as a waveform analysis, CT scan, etc., which require a fast Fourier transform.

What is claimed is:

1. A calculating apparatus quickly processing a one-dimensional Fourier transform, comprising:

a data length resolving unit resolving a data length N of one-dimensional data into a product of m factors $N_1 \times N_2 \times \ldots \times N_m$;

a twiddle factor storing unit setting the data length N as P×Q, calculating twiddle factors that are required for a multiplication with results of a one-dimensional Fourier transform of a length Q, which is performed by P times, for an initial one of Q-1 twiddle factors for multiplication intended for each of P Fourier transform results, while maintaining an order of the product of the m factors and changing P and Q, and storing calculation results in a table; and a Fourier transform unit performing a Fourier transform of data as m separated phases with the table for storing the calculated twiddle factors, wherein said Fourier transform unit includes, a memory area divided into memory regions 1 and 2, storing m-dimensional array regions for storing input data and output data in the m phases, wherein results of a Fourier transform process for input data stored in the region 1 in an odd-numbered chase are stored in positions where a multi-dimensional transposition for an m-dimensional array is performed in said region 2, and wherein results of the Fourier transform process for input data stored in the region 2 in an even-numbered phase are stored in positions where the multi-dimensional transposition for an m-dimensional array is performed in the region 1.

2. A method quickly calculating a one-dimensional Fourier transform using a calculating apparatus, the method comprising a data length resolving step of resolving a data length N of one-dimensional data into a product of m factors $N_1 \times N_2 \times \ldots \times N_m$;

a twiddle factor storing step of setting the data length N as P×Q, calculating twiddle factors that are required for a multiplication with results of a one-dimensional Fourier transform of a length Q, which is performed by P times, for an initial one of Q-1 twiddle factors for multiplication intended for each of P Fourier transform results, while maintaining an order of the product of the m factors and changing P and Q, and storing calculation results in a table; and a Fourier transform step of performing a Fourier transform of data as m separated phases with the table for storing the calculated twiddle factors, wherein in said Fourier transform step, a memory area is divided into memory regions 1 and 2, which store m-dimensional array regions for storing input data and output data in the m phases, results of a Fourier transform process for the input data stored in the region 1 in a first phase are stored in positions where a multi-dimensional transposition for an m-dimensional array is performed in the region 2, outputs results of the Fourier transform process for input data stored in the region 2 in a second phase are stored in positions where the multi-dimensional transposition for an m-dimensional array is performed in the region 1, and a similar process is executed while alternately replacing the regions 1 and 2 as input and output data regions in third and subsequent phases.

3. The method according to claim 2, wherein said twiddle factor storing step comprises a step of respectively setting Q and P as $N_1$ and $N_2 \times N_3 \times \ldots \times Nm$, calculating P-1 twiddle factors, and storing calculation results in a table 1, a step of respectively setting Q and P as $N_2$ and $N_3 \times N_4 \times \ldots \times N_m$, calculating P-1 twiddle factors, and storing calculation results in a table 2, a step of successively changing Q and P in a similar manner, and executing a similar process, and a step of lastly setting Q and P as $N_{m-1}$ and $N_m$, calculating P-1 twiddle factors, and storing calculation results in a table m-1.

4. The method according to claim 3, wherein in each of phases from n=1st phase to n=(m-1)th phase other than a last phase among m phases in said Fourier transform step, a step of calculating other twiddle factors, which are to be multiplied with the results of the one-dimensional Fourier transform performed by P times, and not stored in a table n (=1, 2, . . ., m-1), during an access to data, for which the Fourier transform is to be performed, by using contents stored in the table n as a table making a one-to-one correspondence with n=nth phase, a step of performing the one-dimensional Fourier transform by P times, and a step of multiplying the results of the Fourier transform by the twiddle factors stored in the table n, and by the other calculated twiddle factors are comprised.

5. The method according to claim 4, wherein the other twiddle factors are calculated with recurrence equations by using contents stored in the table n in said step of calculating other twiddle factors.

6. The method according to claim 4, the process further comprising:

a step of storing data of multiplication results obtained in said step of multiplying twiddle factors in bit-reversed positions, and using the data as an output of the nth phase;

a step of storing data of results of the Fourier transform in the last mth phase in bit-reversed positions, and using the data as an output of the mth phase; and a step of making a rearrangement with bit reverse in correspondence with the output of the mth phase.

7. The method according to claim 2, the process further comprising a step of performing a multi-dimensional transposition for an m-dimensional array for storing the results of said Fourier transform step after said Fourier transform step separated in the m phases is terminated.

8. The method according to claim 2, wherein in said Fourier transform step, said memory regions 1 and 2 store input and output data in the mth phase and are regarded as a three-dimensional array, output results of the Fourier transform process for the input data stored in the region 1 in the first phase are regarded as a three-dimensional array in the region 2, and stored in positions where a multi-dimensional transposition is performed in a portion of two dimensions, outputs results of the Fourier transform process for the input data stored in the region 2 in the second phase are stored in positions where a similar multi-dimensional transposition for a three-dimensional array is performed in the region 1, and a similar process is executed while alternately replacing the regions 1 and 2 as input and output data regions in third and subsequent phases.

9. The method according to claim 2, wherein said memory area comprises a cache memory.

10. A calculating apparatus quickly processing a one-dimensional Fourier transform, comprising:

data length resolving means for resolving a data length N of one-dimensional data into a product of m factors $N_1 \times N_2 \times \ldots \times N_m$;

twiddle factor storing means for setting the data length N as P×Q, calculating twiddle factors that are required for a multiplication with results of a one-dimensional Fourier transform of a length Q, which is performed by P times, for an initial one of Q-1 twiddle factors for multiplication intended for each of P Fourier transform results, while maintaining an order of the product of the m factors and changing P and Q, and for storing calculation results in a table; and Fourier transform means for performing a Fourier transform of data as m separated phases with the table for storing the calculated twiddle factors, wherein said Fourier transform means includes a storage means divided into storage regions 1 and 2, for storing m-dimensional array regions which store input data and output data in the m phases, wherein results of a Fourier transform process for the input data stored in the region 1 in an odd-numbered phase are stored in positions where a multi-dimensional transposition for an in-dimensional array is performed in the region 2, and wherein results of a Fourier transform process for the input data stored in the region 2 in an even-numbered phase are stored in positions where a multi-dimensional transposition for an in-dimensional array is performed in the region 1.

* * * * *